(12) United States Patent
Xu et al.

(10) Patent No.: US 7,016,203 B2
(45) Date of Patent: Mar. 21, 2006

(54) SELF-DRIVEN CIRCUIT FOR SYNCHRONOUS RECTIFIER DC/DC CONVERTER

(75) Inventors: Ming Xu, Blacksburg, VA (US); Fred C. Lee, Blacksburg, VA (US); Yuancheng Ren, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 57 days.

(21) Appl. No.: 10/852,683

(22) Filed: May 25, 2004

(65) Prior Publication Data

US 2004/0257837 A1 Dec. 23, 2004

Related U.S. Application Data

(63) Continuation-in-part of application No. 10/350,330, filed on Jan. 24, 2003, now Pat. No. 6,819,574.

(51) Int. Cl.
*H02M 3/335* (2006.01)
(52) U.S. Cl. .................. 363/21.04; 363/24.07
(58) Field of Classification Search ............ 363/15–17, 363/21.04, 21.06, 21.07, 24, 25, 39, 59, 123, 363/125, 131–134
See application file for complete search history.

(56) References Cited

U.S. PATENT DOCUMENTS

| 4,449,175 | A | * | 5/1984 | Ishii et al. ................ 363/17 |
| 6,091,616 | A | * | 7/2000 | Jacobs et al. ............. 363/127 |
| 6,388,896 | B1 | * | 5/2002 | Cuk ........................... 363/16 |
| 6,819,574 | B1 | * | 11/2004 | Xu et al. ................. 363/21.04 |

* cited by examiner

*Primary Examiner*—Adolf Berhane
(74) *Attorney, Agent, or Firm*—Whitham, Curtis & Christofferson, PC

(57) ABSTRACT

A power converter having a primary circuit (e.g. full bridge) and a secondary circuit (e.g. current doubler) has switches in the secondary circuit that are controlled by a drive circuit. The drive circuit is connected to a swing node in the primary circuit, and is powered by the primary circuit. The drive circuit has an isolation device such as a transformer to provide electrical isolation between the primary circuit and secondary circuit. The drive circuit provides a current source for driving the secondary switch gates, thereby reducing power consumption. The present drive circuit provides clean gate drive signals without noise and oscillations. The drive circuits of the invention are simple, and require only a few components.

18 Claims, 11 Drawing Sheets

SELF-DRIVEN CIRCUIT FOR SYNCHRONOUS RECTIFIER DC/DC CONVERTER

CROSS-REFERENCE TO RELATED APPLICATIONS

The present application is a continuation-in-part and claims the benefit of priority from application U.S. Ser. No. 10/350,330, filed Jan. 24, 2003 U.S. Pat. No. 6,819,574, the complete contents of which is herein incorporated by reference.

FIELD OF THE INVENTION

The present invention relates generally to electrical power supplies. More particularly, it relates to switching power converters and a circuit for driving secondary-side switches with energy from the primary side.

BACKGROUND OF THE INVENTION

Synchronous rectifier DC/DC converters typically have a primary circuit and a secondary circuit coupled through a transformer. The secondary circuit has switches that rectify the power coupled through the transformer. Such power converters are commonly used to provide the low-voltage, high-current power required for operating microprocessors and the like from higher voltage power sources.

In recent years, successive generations of microprocessors have required power with decreased voltage, increased current, decreased ripple and increased current slew rate. For example, some microprocessors currently in development will require 100 Amps at 1 volt with less than 25 mV ripple. Additionally, circuitboard space is limited, and the high cost of large capacity filtering components (e.g. capacitors, inductors) must be avoided. In order to meet these requirements, power converters must operate at higher frequencies. However, higher frequency operation results in greatly reduced power efficiency. Specifically, increasing frequency results in higher switching losses (e.g. reverse recovery loss), higher gate driving losses and higher body diode conduction losses. To make high frequency operation possible, and hence provide power converters for future microprocessors, these losses must be reduced.

Several methods for reducing gate drive losses and for self-driving secondary gates are known in the art. For example, secondary switches can be self-driven by a cross coupled secondary circuit design. However, the cross-coupled secondary design does not function properly for very low output voltages because there is insufficient voltage to drive the switch gates.

Another known self-driving technique is described by Pedro Alou et al. in "A new self driving scheme for synchronous rectifiers: single winding self-driven synchronous rectification", published in IEEE Transactions On Power Electronics, Vol. 16, No. 6, November 2001. In this technique, secondary side switches are driven by a circuit powered from an additional winding on the main transformer. A problem with this technique is ringing in the gate drive signal, which tends to turn off the secondary switches at inappropriate times. Also, it requires an additional winding on the transformer, which complicates the transformer design. Further, it tends to result in increased body diode conduction loss.

It would be an advance in the art of electrical power conversion to be able to reduce gate drive losses such that higher frequency operation of power converters is practical. It would be particularly advantageous to reduce gate drive losses using a self-drive scheme that does not produce ringing and unwanted noise in the secondary circuit, and provides reduced body diode conduction loss.

SUMMARY OF THE INVENTION

The present invention includes a power converter with a primary circuit, a secondary circuit, and a driver for driving switches in the secondary circuit. The driver is connected to, and obtains power from, a swing node in the primary circuit. The driver circuit includes an isolation device (e.g. drive transformer, piezotransformer, optoisolator) so that the primary circuit and secondary circuit are electrically isolated.

The primary circuit can be a full bridge circuit, an active clamp forward circuit, or an asymmetrical half bridge circuit, for example. The secondary circuit can be a half-wave circuit, a center-tapped circuit, or a current-doubler circuit, for example.

The driver circuit can have a damping resistor for preventing voltage oscillations at a gate of the secondary side switch. The damping resistor preferably has a small resistance, for example, less than 5 Ohms, or 1 Ohm. If a drive transformer is used, it preferably has a small leakage inductance, for example, less than 10 or 5 nanohenries.

The driver circuit can control two secondary side switches.

Also, the present invention includes embodiments where the drive's transformers and power transformers are combined on a single transformer core. In this embodiment, the transformer includes primary drive windings that are coupled to the secondary drive windings, which tends to reduce leakage inductance and increase power efficiency.

DETAILED DESCRIPTION OF THE INVENTION

The present invention provides a circuit for self driving secondary switches in a synchronous rectifier power converter. In the present invention, power for driving the secondary-side switch gates is derived from swing nodes in the primary side circuit. Swing nodes are defined as points in the primary side circuit that oscillate widely in voltage. Typically, the swing nodes are points in the primary side circuit where two switches are connected. Power from the swing nodes is coupled through a drive transformer (or other isolation device such as a piezotransformer or optoisolator) to the secondary side switch gates. Capacitors, diodes and resistors can be connected to the drive transformer to condition the gate drive energy (e.g. prevent ringing and oscillations and provide negative voltage clamping). The present invention can be used in combination with many kinds of primary circuits and secondary circuits, in any combination. For example, the present invention can be used with full bridge, active clamp forward, and asymmetric half-bridge type primary circuits, and can be used with half-wave, center-tapped, and current-doubler type secondary circuits. The present invention can reduce gate drive losses by about 50% during high frequency operation (e.g. above 500 kHz) compared to prior art self-drivers for secondary circuits. Also, the present invention provides clean gate drive signals, without problematic noise or oscillations.

Figure 1:
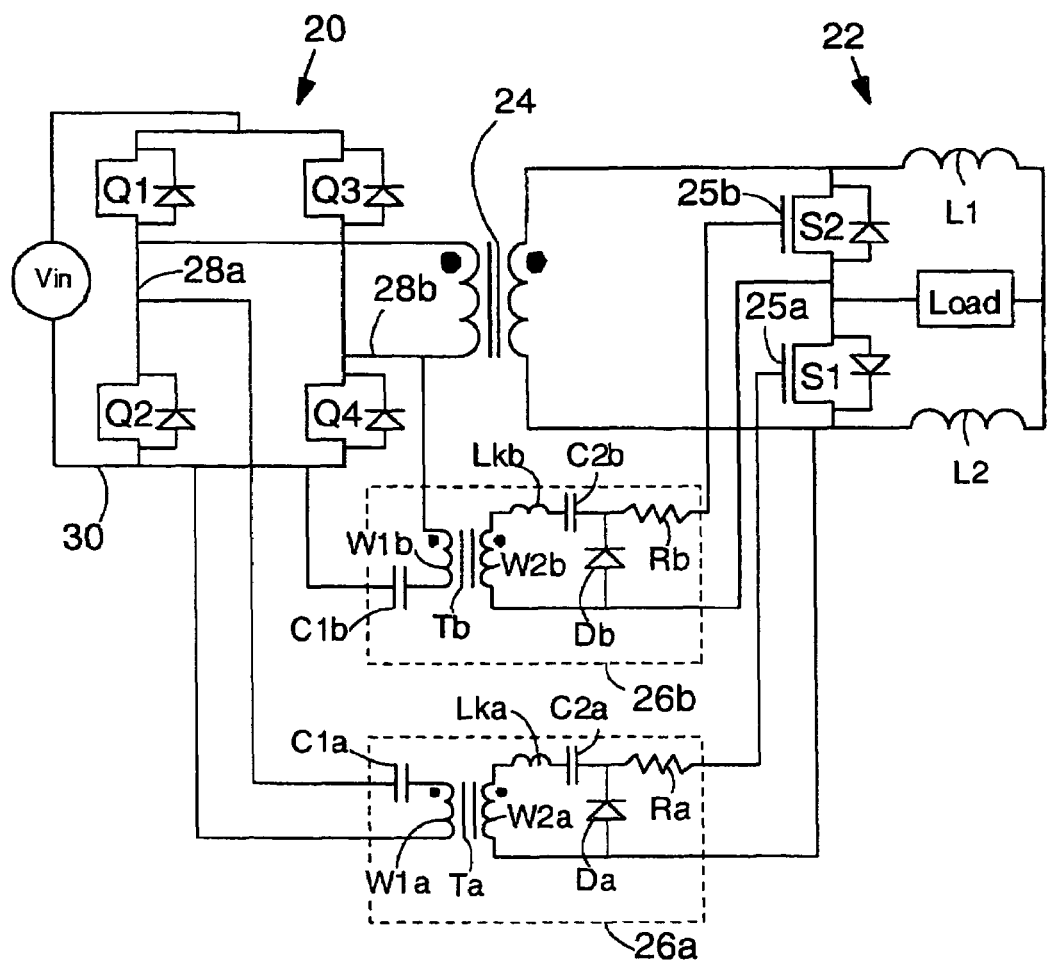
FIG. 1 shows a full bridge current doubler power converter according to the present invention.

FIG. 1 shows a power converter according to one embodiment of the present invention. The power converter has a full bridge circuit 20 (comprising Q1–Q4) and a current doubler circuit 22 (comprising S1, S2, L1, and L2) coupled with a main power transformer 24, as known in the art. A power source Vin provides power to the full bridge circuit 20. Driver circuits 26a 26b are connected to the full bridge circuit 20 and to the current doubler circuit 22. In the present invention, control gates 25a 25b of switches S1 and S2 are controlled by the driver circuits 26a 26b, respectively. Switches Q1–Q4 are controlled by another driver circuit which is not shown, but is well known in the art. The full bridge circuit 20 is a specific kind of primary circuit that can be used in the invention; the current doubler circuit is a specific kind of secondary circuit that can be used in the invention. The full bridge primary circuit 20 of FIG. 1 has two legs, but the present invention can also be used with full bridge circuits having 3, 4 or any number of legs.

Driver circuits 26a 26b are powered by connection to swing nodes 28a 28b of the full bridge circuit 20. Driver circuit 26a is connected across switch Q2 and driver circuit 26b is connected across switch Q4. Driver circuits 26a 26b are also connected to ground 30 of the fill bridge circuit 20. Each driver circuit has a drive transformer Ta Tb, and each drive transformer has a primary winding W1a W1b, and a secondary winding W2a W2b. A primary capacitor C1a C1b is connected in series with each primary winding W1a W1b. Each drive transformer Ta Tb has associated leakage inductance Lka Lkb. The drive transformers Ta Tb provide electrical isolation between the fill bridge circuit 20 and current doubler circuit 22. Each drive circuit also has a secondary capacitor C2a C2b, a damping resistor Ra Rb, and a clamping diode Da Db connected as shown. The driver circuits 26a 26b of the present invention control the secondary switches S1 S2 in response to operation of the fill bridge switches Q1–Q4.

Swing nodes 28a 28b are defined in the invention as points in a primary circuit that oscillate in voltage according to a pattern that is the same as a switching pattern of switches in a secondary circuit. Typically, the swing node will be a point in the primary circuit where two switches are directly connected.

Figure 2:
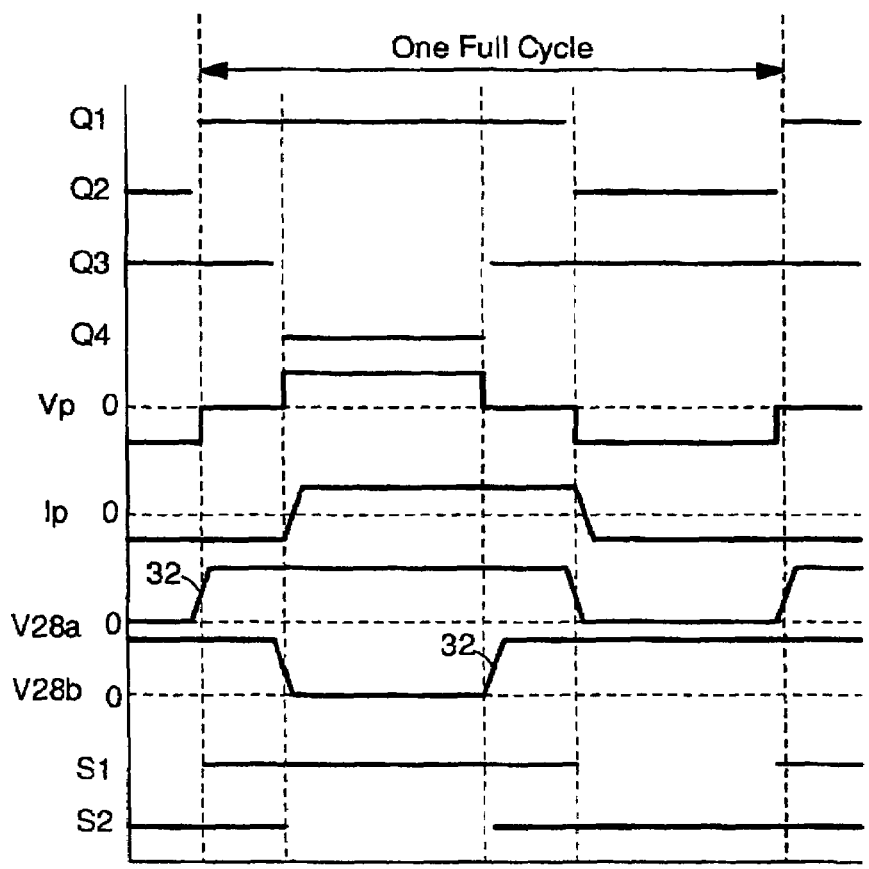
FIG. 2 shows a switching scheme for operating the power conversion circuit of FIG. 1.

FIG. 2 shows a complimentary control switching scheme for operating the power converter of FIG. 1. Horizontal lines indicate when switches Q1–Q4 and S1–S2 are ON. Vp is the voltage across primary winding of transformer 24. Ip is the current through primary winding of transformer 24. V28a is the voltage at swing node 28a; V28b is the voltage at swing node 28b. From FIG. 2 it is apparent that switches S1 and S2 are ON when switches Q2 and Q4 are OFF, respectively. This is because rising voltage 32 at the swing nodes 28a 28b increases voltage at gates 25a 25b, respectively, and thereby turns ON switches S1 and S2, respectively.

Drive transformers Ta Tb can have a 1:1 turns ratio or any other turns ratio that provides a desired voltage level for driving gates 25a 25b. For example, if the power source Vin provides relatively high voltage, then the drive transformers Ta Tb can have a turns ratio of less than 1 so that gates of S1 and S2 receive reduced voltage.

It is noted that the polarity of the drive transformers Ta Tb may be dependent on the control scheme. For example, the polarity of the drive transformers Ta Tb in FIG. 1 is appropriate for use with the complementary control scheme illustrated in FIG. 2. other control schemes may require drive transformers with different polarity.

Primary capacitors C1a C1b prevent saturation of the cores of the drive transformers Ta Th (i.e. by providing voltage-second balance) and are necessary in the invention when drive transformers Ta Th are used. The capacitance of capacitors C1a C1b partially depends on the power requirements of gates 25a 25b.

Clamping diodes Da Db prevent voltage reversals (i.e. negative voltages) from being applied to the gates 25a 25b. They are optional, but preferred in the present invention.

In operation, LC oscillations are produced between the leakage inductances Lka Lkb, secondary capacitors C2a C2b and the capacitance of the gates 25a 25b. Damping resistors Ra Rb are provided to dampen these LC oscillations. Specifically, damping resistors Ra Rb should have resistance values high enough so that switches S1 S2 are not repeatedly switched by the LC oscillations. That is, resistance values of Ra and Rb should be high enough so that switches S1 and S2 change state exactly once per transition.

The amplitude of the LC oscillations is roughly proportional to the value of the leakage inductances Lka Lkb and capacitances of the gates 25a 25b. Therefore, it is best to use drive transformers Ta Tb with leakage inductances that are as small as possible, and use switches with small gate capacitances. Low leakage inductance and small gate capacitance allows for smaller values of resistance for damping resistors Ra Rb. Low damping resistance has the great advantage of increasing the power efficiency of the driver circuits 26a 26b. It is noted that the damping resistor Ra Rb can be eliminated if the LC oscillations do not produce voltages that cause switching of the secondary switches S1 S2 (i.e. if the voltage troughs during LC oscillation do not go below the switching threshold of switches S1 S2).

Figure 3:
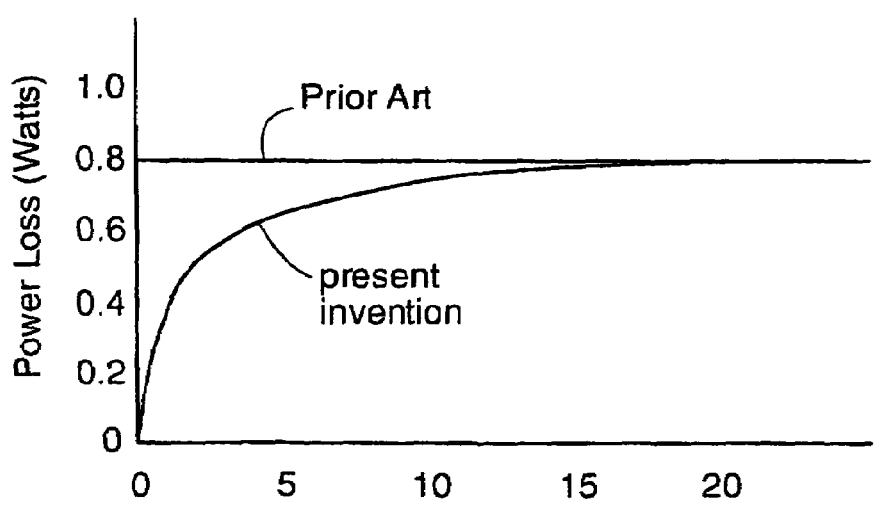
FIG. 3 shows a graph of gate drive power loss for a specific implementation of the present invention and for a conventional gate drive circuit according to the prior art.

FIG. 3 illustrates power loss of the driver circuits 26a 26b versus resistance of damping resistors Ra Rb for a specific case with Lk=4 nanoHenries (nH), S1, S2 gate capacitance of 8 nanoFarads (nF) and operation at 1 MHz. Also shown is the loss for a conventional gate driver circuit having a gate resistor in series with a switch gate. In the present invention, power loss is decreased, and efficiency increased, by reducing the resistance of the damping resistors as much as possible, while retaining enough damping resistance to inhibit LC oscillations. In the present invention, dissipated power is approximately proportional to the inverse of damping resistance. The power loss reduction in the present invention is a result of the fact that the drive transformers Ta Th provide essentially a current source instead of a voltage source (as in the conventional art) to the gates 25a 25b. The present driver is a current source because the gate capacitances of S1 and S2 behave as snubber capacitors, as seen from the primary side through the drive transformers Ta Th. By comparison, conventional gate drives provide a voltage source to drive the switch gates. As a result, changing resistance in series with the gate does not affect the amount of dissipated power in the conventional gate driver.

Hence, by selecting drive transformers Ta Th with low leakage inductances (e.g. below 5 or 10 nH), and minimizing gate capacitance (e.g. below 5 or 10 nF), low damping resistances can be used, and efficiency can be greatly increased over the gate driver circuits of the prior art. Another advantage of having small leakage inductances Lka Lkb and small gate capacitances (of secondary side switches) is that it tends to reduce the dead time (i.e. time lag). A short dead time tends to reduce power loss (e.g. reduced body diode conduction) in the present power converter.

As a specific example, if the leakage inductance Lk is about 3–10 nH, and the gate capacitance of secondary switches S1 S2 is about 8 nF, then the damping resistor R can be about 0.5–1 Ohm.

Figure 4:
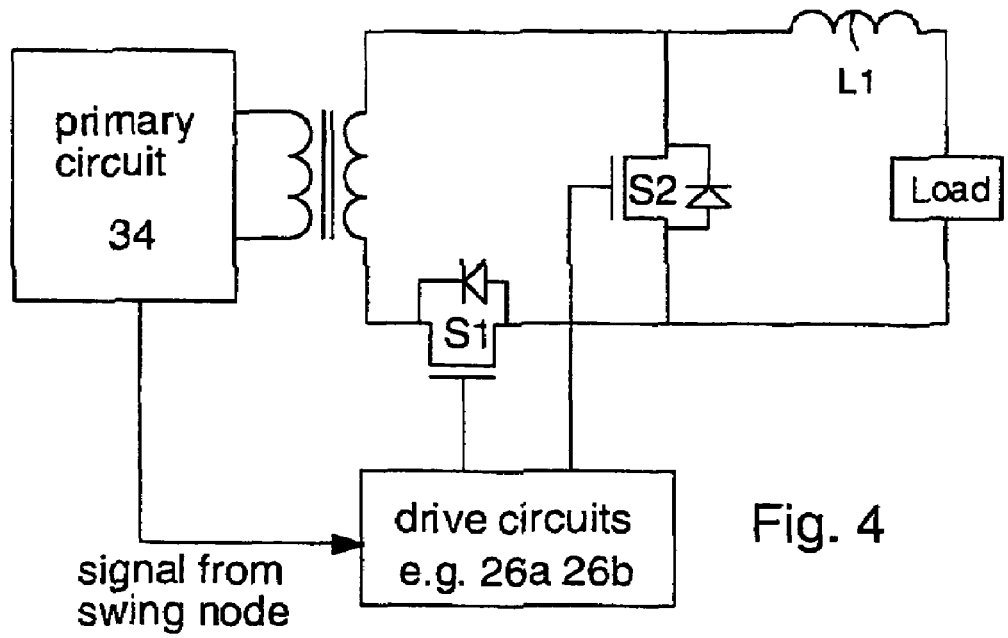
FIG. 4 shows a half-wave type secondary circuit that can be used with the driver circuits of the present invention.
Figure 5:
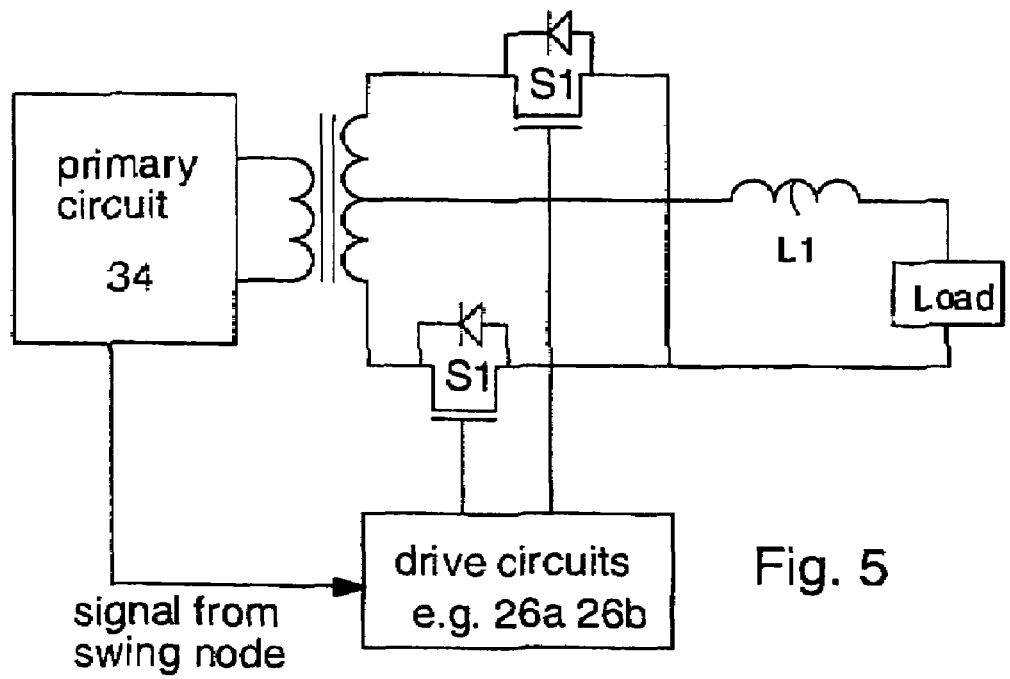
FIG. 5 shows a center-tapped type secondary circuit that can be used with the driver circuits of the present invention.

The present invention can be used with many different kinds of secondary circuits. For example, FIG. 4 shows a half-wave secondary circuit that can be used with the driver circuits of the present invention. The switches S1 S2 are connected to drive circuits 26a 26b. A primary circuit 34 can be a full bridge circuit 20 or other kind of primary circuit. FIG. 5 shows a center-tapped secondary circuit which can be used with the driver circuits of the present invention. The half-wave and center-tapped secondary circuits of FIGS. 4 and 5 can be used with the driver circuits 26a 26b illustrated in FIG. 1, or any other driver circuits disclosed herein.

Figure 6:
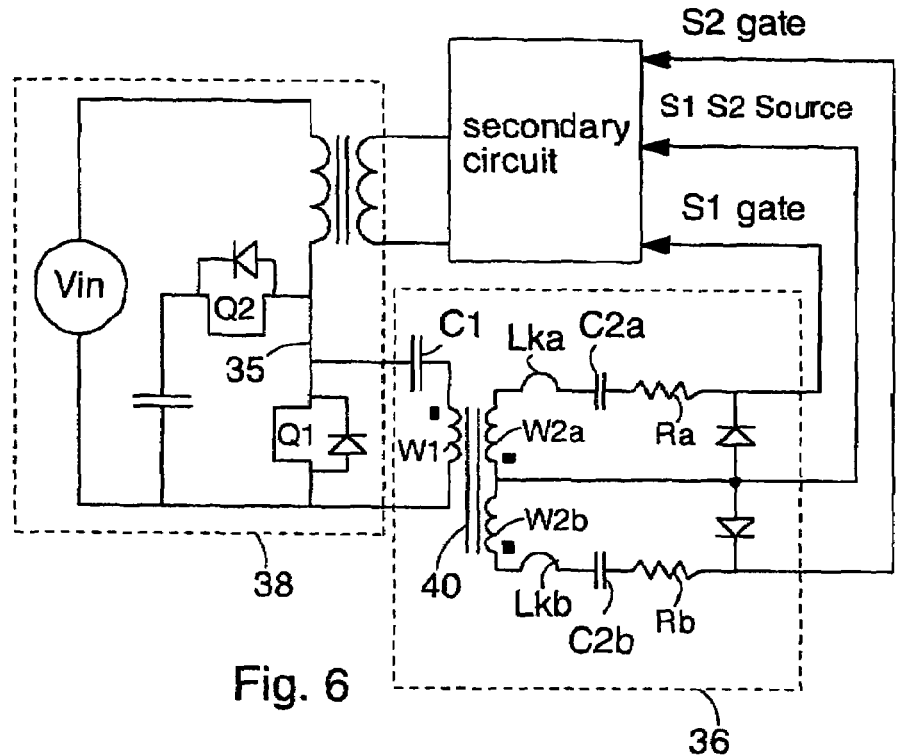
FIG. 6 shows a power converter with an active clamp forward primary circuit in combination with a driver circuit according to the present invention.

The driver circuits of the present invention can also be used with many different kinds of primary circuits. FIG. 6, for example shows a driver circuit 36 according to the present invention combined with an active clamp forward primary circuit 38. Driver circuit 36 is connected to swing node 35 through primary capacitor C1. In this embodiment, the drive transformer 40 has a single primary winding W1 coupled to two secondary windings W2a W2b. Drive circuit 36 provides gate drive signals for both S1 and S2. The gate drive signals for S1 and S2 have opposite polarities, as evidenced by the polarity markings (small squares) adjacent to the drive transformer 40 windings. The secondary circuit can be the current doubler of FIG. 1, the half-wave of FIG. 4, or the center-tapped of FIG. 5. The operation principle of the circuit of FIG. 6 is the same as for FIG. 1.

Figure 7:
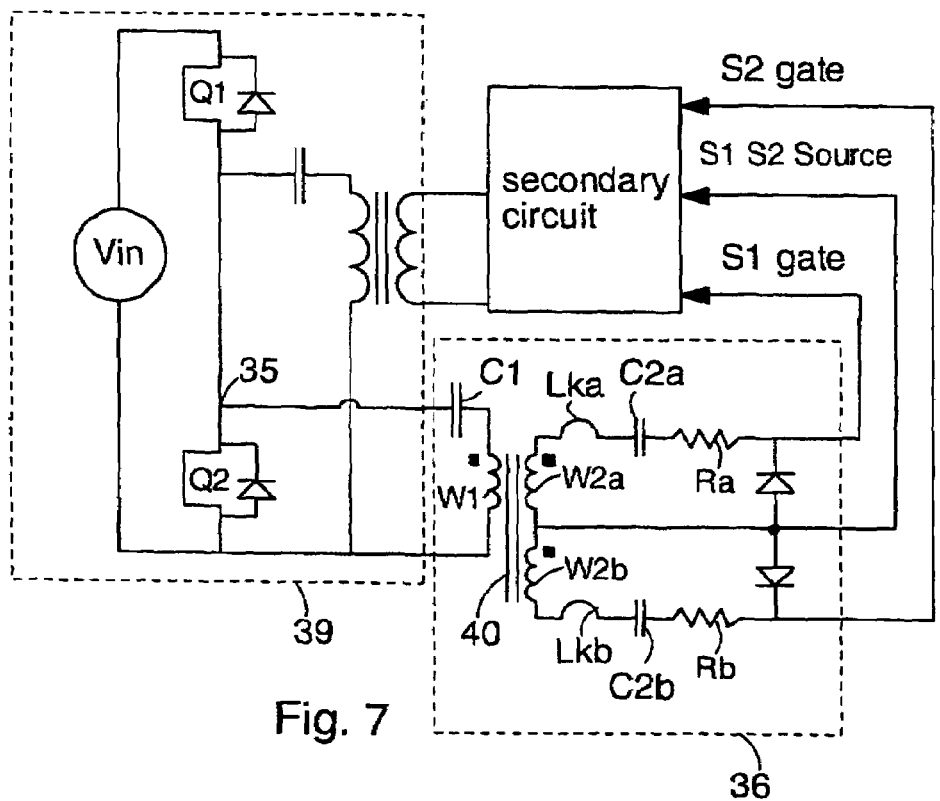
FIG. 7 shows a power converter with an asymmetrical half bridge primary circuit in combination with a driver circuit according to the present invention.

FIG. 7 shows an asymmetrical half bridge primary circuit 39 in combination with the driver circuit 36 of the present invention. Driver circuit 36 is connected to swing node 35 through primary capacitor C1. In FIG. 7, the polarity of the windings of the transformer 40 are reversed compared to the circuit of FIG. 6.

In view of the foregoing, there are at least 9 possible combinations of primary circuits (full bridge, active clamp forward, and asymmetric half bridge) and secondary circuits (half wave, center tapped, and current doubler) contemplated in the invention.

Figure 8:
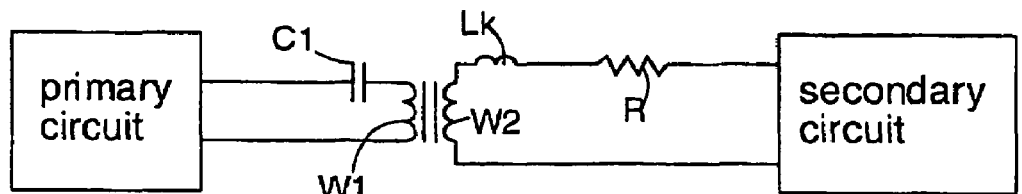
FIGS. 8–11 show alternative drive circuits according to the present invention.

The driver circuit according to the present invention can be modified in many ways. FIG. 8, for example, shows a driver circuit according to the present invention that does not have a clamping diode or a secondary capacitor. The driver circuit of FIG. 8 has only a damping resistor R in series with the secondary winding W2. In fact, the damping resistor R can be eliminated if the secondary winding W2 or other circuit components in series provide enough resistance. However, primary capacitor C1 is necessary in the invention when a transformer is used.

Figure 9:
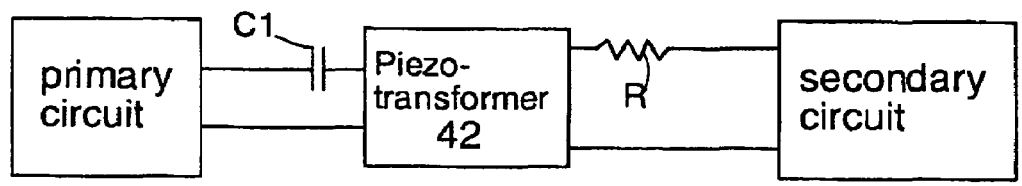

FIG. 9 illustrates another embodiment of the invention where the drive transformer is replaced with a piezo-transformer 42. The piezo-transformer 42 is an isolation device that provides isolation in the same manner as the drive transformer. It is noted that the primary capacitor C1 is needed if the piezotransformer is used.

Figure 10:
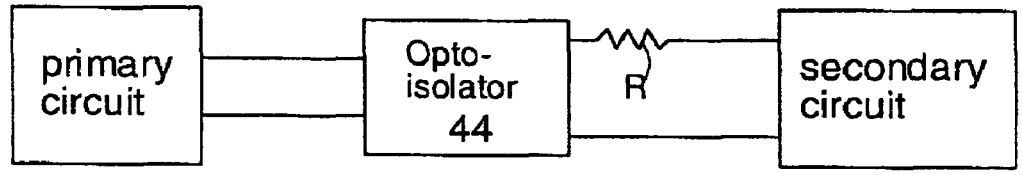

FIG. 10 illustrates another embodiment of the invention where the drive transformer is replaced with an opto-isolator 44. The opto-isolator 44 is an isolation device that provides isolation in the same manner as the drive transformer. It is noted that the primary capacitor C1 is not needed if the optoisolator is used.

Figure 11:
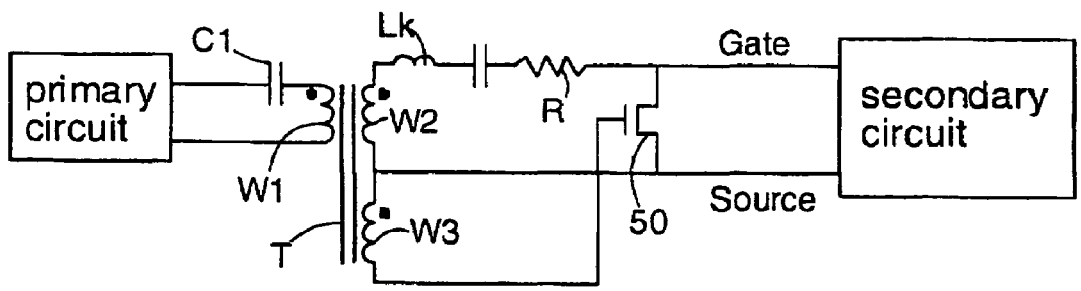

FIG. 11 illustrates an alternative embodiment having a driver switch 50 (e.g. MOSFET) connected across the driver circuit. The driver switch 50 is controlled by a trigger winding W3 of the drive transformer T. Driver switch 50 is connected across the Gate and Source connections of switches in the secondary circuit, as illustrated. The embodiment of FIG. 11 provides a fast transient response compared to driver circuits without a driver switch 50 and trigger winding W3. This tends to reduce dead time duration, and hence, body diode conduction losses.

Figure 12:
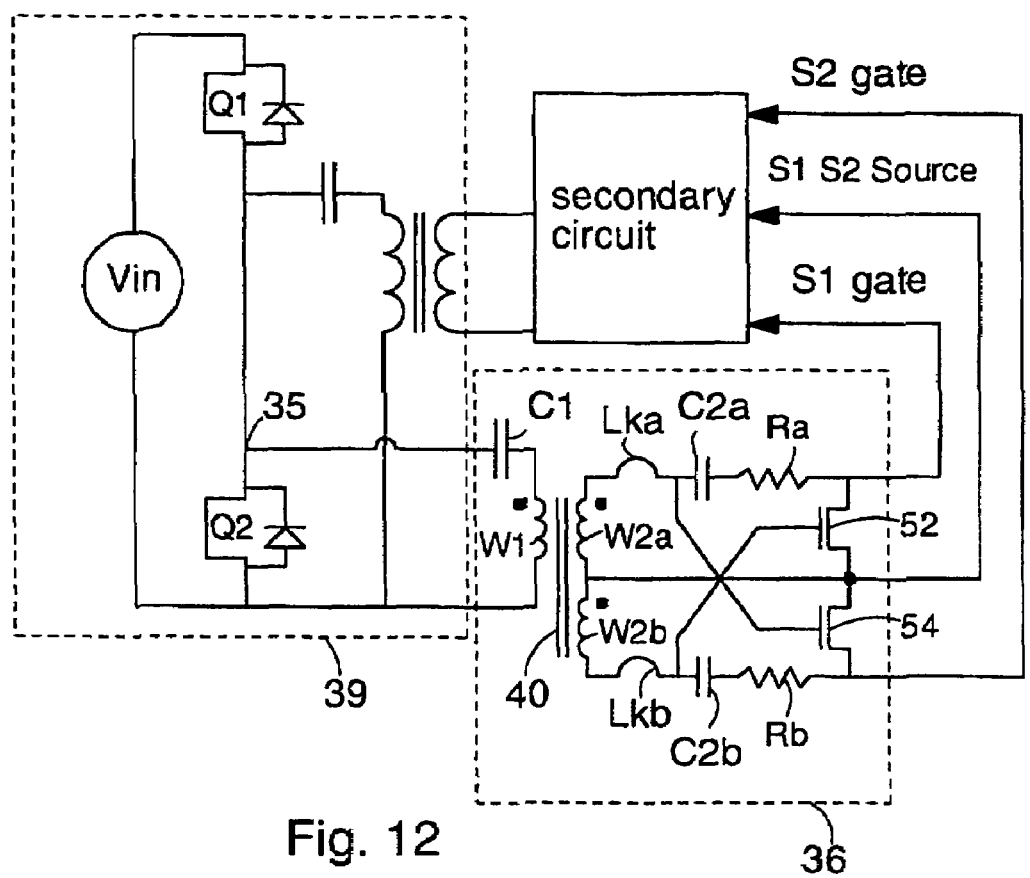
FIG. 12 shows an alternative driver circuit that has two driver switches for driving the secondary switches.

FIG. 12 shows yet another embodiment where the driver circuit 36 has two driver switches 52 54 connected in a cross-coupled fashion for driving the secondary switches. The driver switches can be MOSFETs or other field-effect transistors. Secondary switch S1 turns ON when driver switch 52 turns OFF; Secondary switch S2 turns ON when driver switch 54 turns OFF. Also, secondary switches S1 and S2 are turned OFF faster due to the drive switches, which discharge gate capacitances of S1 and S2 very rapidly. Fast turnoff of S1 and S2 provides shorter deadtime, and hence reduced power loss. It is noted that the driver circuit of FIG. 12 can also be used with the active clamp forward circuit of FIG. 6, and any of the secondary circuits disclosed herein. The driver circuit of FIG. 12 cannot be used with the full bridge primary circuit of FIG. 1.

In all the embodiments described above drive transformers Ta Th must be separate from the main power transformer 24. The drive transformers increase the number of components and space required, thereby increasing cost.

Figure 13:
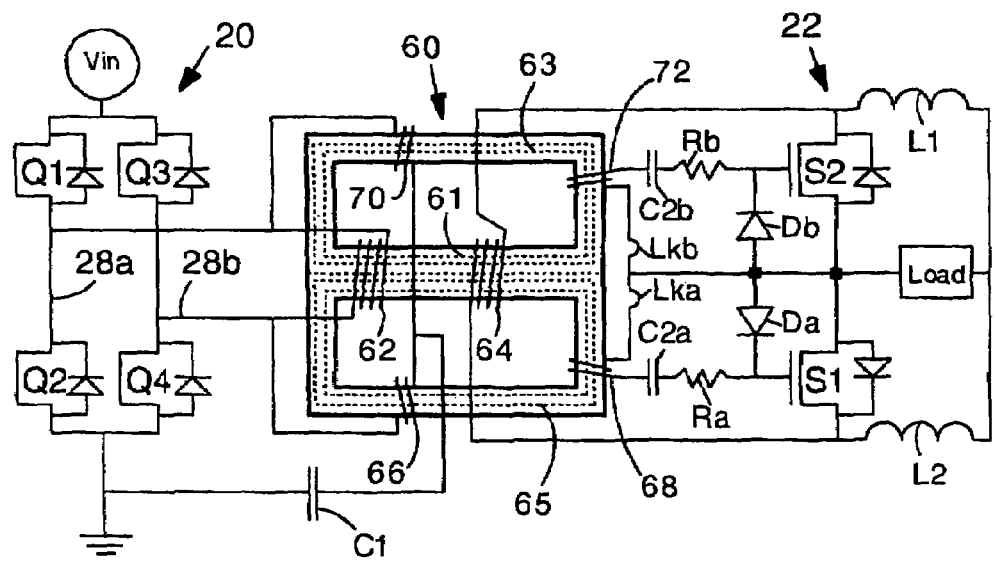
FIG. 13 shows an alternative embodiment having a shared transformer core. Power and drive windings are all disposed on the same transformer core.

The present invention includes alternative embodiments in which the drive transformers Ta Th and the main power transformer 24 have a shared transformer core. FIG. 13 shows a specific example of a shared-core embodiment in which the primary circuit 20 is a full-wave bridge, and the secondary circuit 22 is a current doubler.

In the embodiment of FIG. 13, a transformer core 60 has a figure-8 topology. The transformer core 60 has a central yoke 61 and two side yokes 63 65. Power primary winding 62 and power secondary winding 64 are wound on the central yoke 61. Windings 62 64 transfer power from the primary circuit to the secondary circuit. A first drive primary 66 and first drive secondary 68 are provided on the side yoke 65. A second drive primary 70 and second drive secondary 72 are provided on the side yoke 63. Drive windings 66 68 70 72 provide voltage waveforms for drive control of secondary switches S1 S2. It is significant that the shared transformer includes distinct primary drive windings 66 70. The primary drive windings are coupled to the secondary drive windings 68 72.

The embodiment of FIG. 13 can be operated according to the timing diagram of FIG. 2. Alternatively, other kinds of hard or soft switching control can be used.

The primary capacitor C1 is connected between the drive primary windings and ground. As in the prior embodiments, the primary capacitor C1 prevents saturation of the transformer core 60. In the embodiment of FIG. 13, the primary capacitor C1 provides this function for both first and second primary drive windings 66 70. It is noted that primary capacitor C1 is necessary in embodiments having a shared transformer core.

Secondary capacitors C2a C2b, damping resistors Ra Rb, and clamping diodes Da Db are also provided as shown, though they are optional. Also, the drive secondary windings 68 72 have leakage inductances Lka Lkb.

It is noted that the leakage inductances Lka Lkb are relatively small in the shared-core embodiment, compared to embodiments having distinct drive transformers. This is because the primary drive windings 66 70 tend to reduce the leakage inductance associated with the secondary drive windings 68 72. In other words, the shared-core design tends to provide tight coupling between winding pairs. Lower values for leakage inductance Lka Lkb are beneficial because they allow for lower-resistance damping resistors Ra Rb, and thereby lower power dissipation and higher efficiency.

Since the drive windings and power windings are consolidated on a single transformer, the size of the circuit typically can be reduced compared to embodiments having separate drive transformers (e.g. circuits of FIGS. 1, 4, 5, 6). A single shared transformer core generally requires less circuitboard space than 3 separate transformers.

Figure 14:
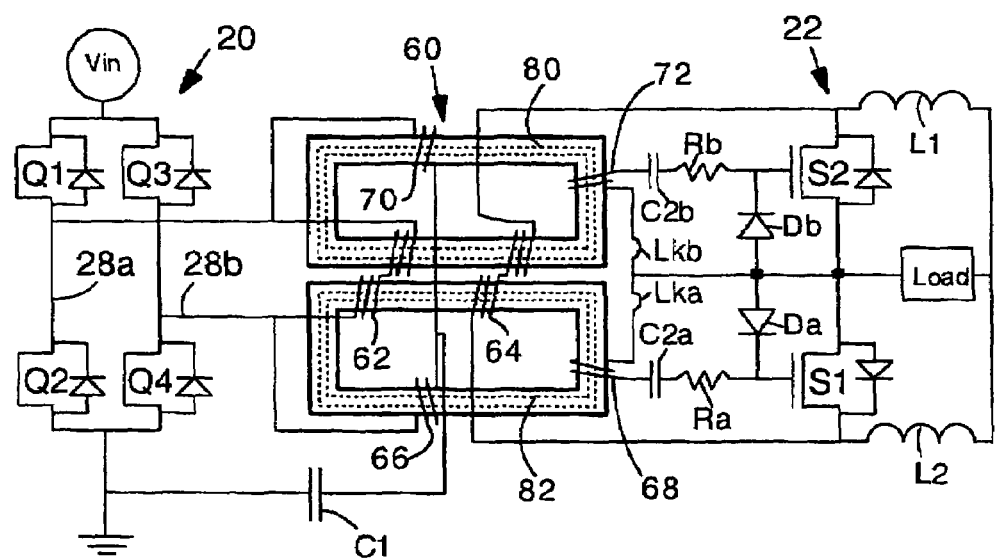
FIG. 14 shows an alternative embodiment having a shared transformer core in which the transformer core has two separate toroidal cores.

FIG. 14 shows another embodiment of the invention having two separate toroidal transformer cores 80 82 instead of a single figure-8 core. Power windings 62 64 are provided on both transformer cores. Power windings 62 64 are each shown as having two windings (one for each core 80 82) in series. Alternatively, the power windings 62 64 can each have two windings (one for each core 80 82) in parallel. Each toroidal core has a pair of drive windings, connected in the same manner as in FIG. 13.

The present invention includes any of the 9 possible combinations of primary circuits (full bridge, active clamp forward, and asymmetric half bridge) and secondary circuits (half wave, center tapped, and current doubler) having a transformer core shared by power and drive windings. The transformer can have a figure-8 topology, or can comprise two toroidal transformers, for example.

Figure 15:
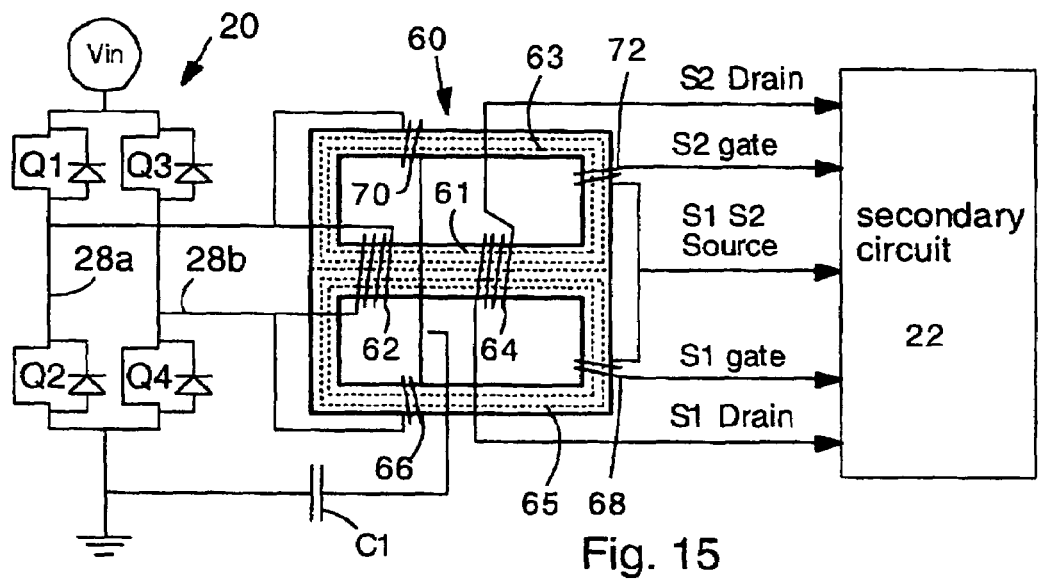
FIG. 15 shows an embodiment having a full bridge primary and shared figure-8 transformer in combination with a generalized secondary circuit.

FIG. 15 shows an embodiment with a shared figure-8 transformer core and a full bridge primary circuit in combination with a generalized secondary circuit 22. The secondary circuit can be a half wave, center tapped, or current doubler (as in FIG. 13).

Figure 16:
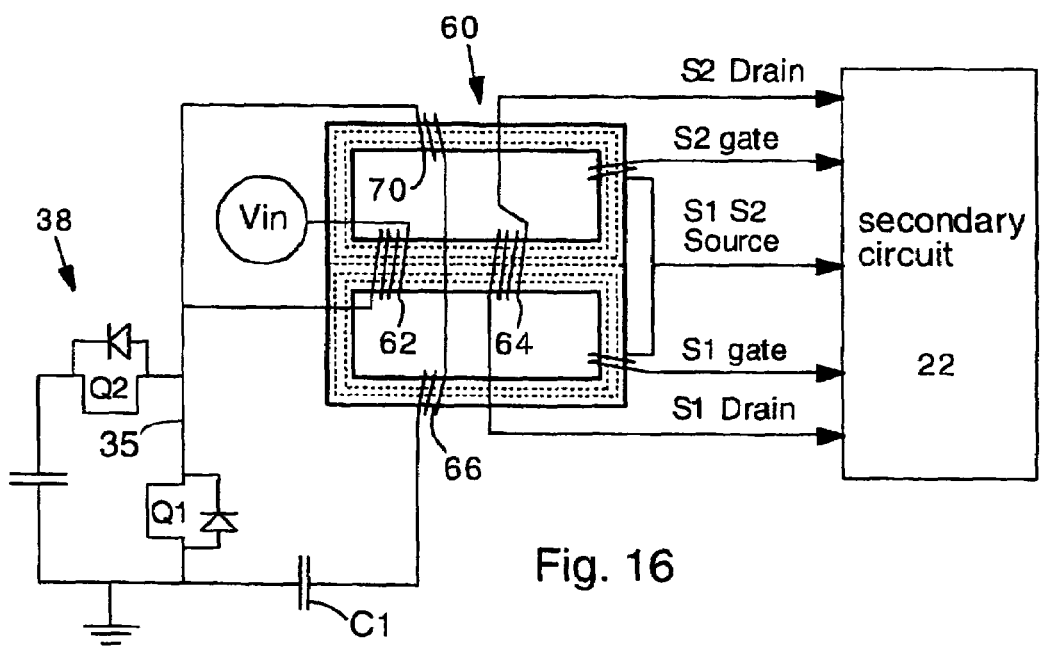
FIG. 16 shows an embodiment having a shared figure-8 core and an active clamp forward primary circuit, in combination with a generalized secondary circuit.

FIG. 16 shows an embodiment with a shared figure-8 transformer core and an active clamp forward primary circuit 38. The secondary circuit can be any of the secondary circuits disclosed herein (current doubler circuit, half wave circuit, or center tapped circuit).

Figure 17:
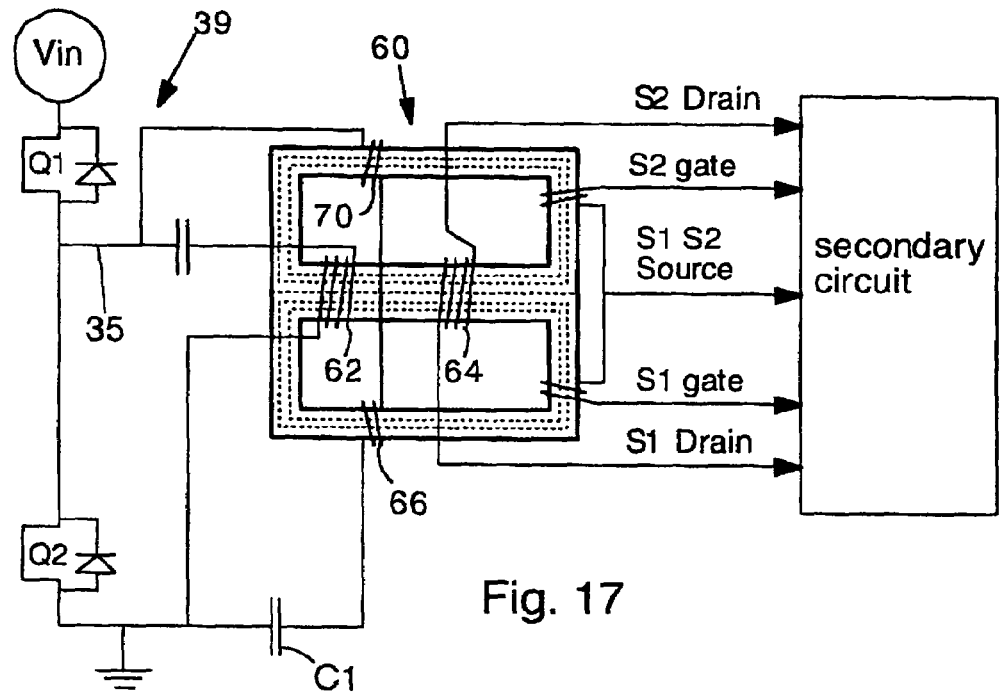
FIG. 17 shows an embodiment having a shared figure-8 core and an asymmetrical half-bridge primary circuit, in combination with a generalized secondary circuit.

FIG. 17 shows an embodiment with a shared figure-8 transformer core and a asymmetrical half bridge primary circuit. The secondary circuit can be any of the secondary circuits disclosed herein (current doubler circuit, half wave circuit, or center tapped circuit).

Figure 18:
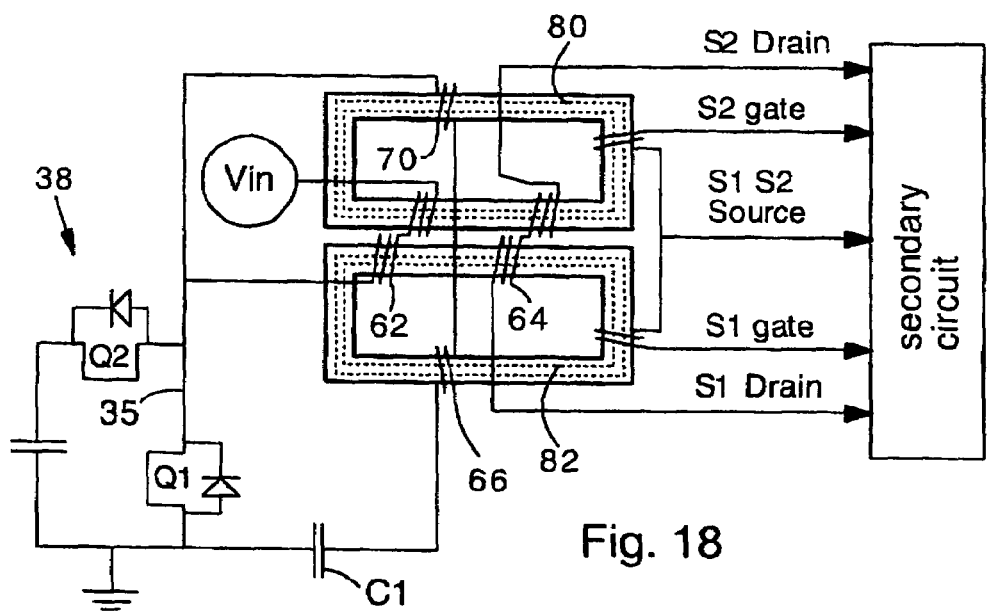
FIG. 18 shows an embodiment having two separate toroidal cores and an active clamp forward primary circuit, in combination with a generalized secondary circuit.

FIG. 18 shows an active clamp forward primary circuit 38 in combination with two separate toroidal transformers. The secondary circuit can be any of the secondary circuits disclosed herein (current doubler circuit, half wave circuit, or center tapped circuit).

Figure 19:
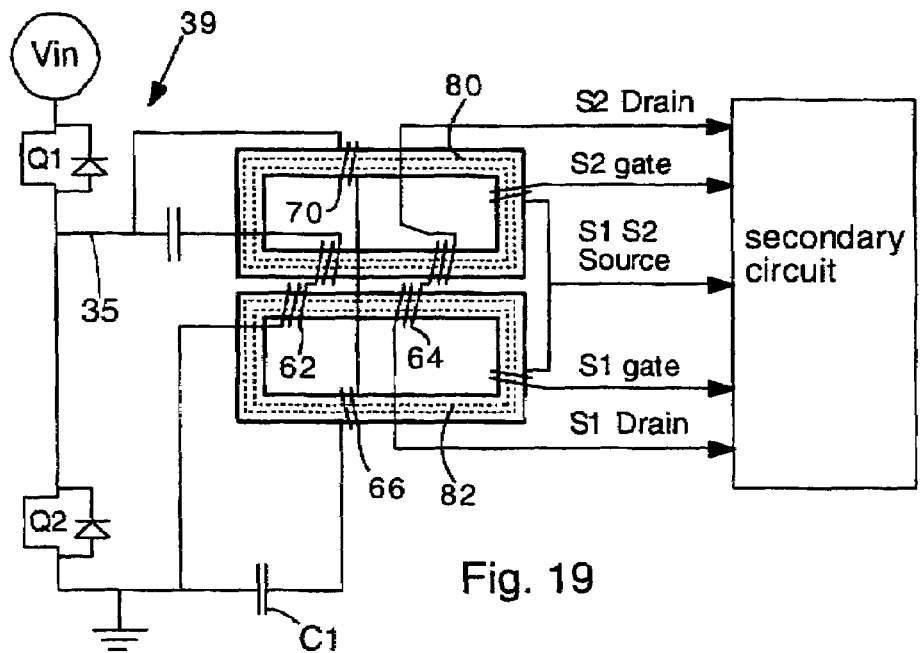
FIG. 19 shows an embodiment having two separate toroidal cores and an asymmetrical half-bridge primary circuit, in combination with a generalized secondary circuit.

FIG. 19 shows an asymmetrical half bridge primary circuit in combination with two separate toroidal transformers. The secondary circuit can be any of the secondary circuits disclosed herein (current doubler circuit, half wave circuit, or center tapped circuit).

Secondary capacitors, damping resistors and clamping diodes are not shown for brevity in FIGS. 15–19, but may be included.

Figure 20:
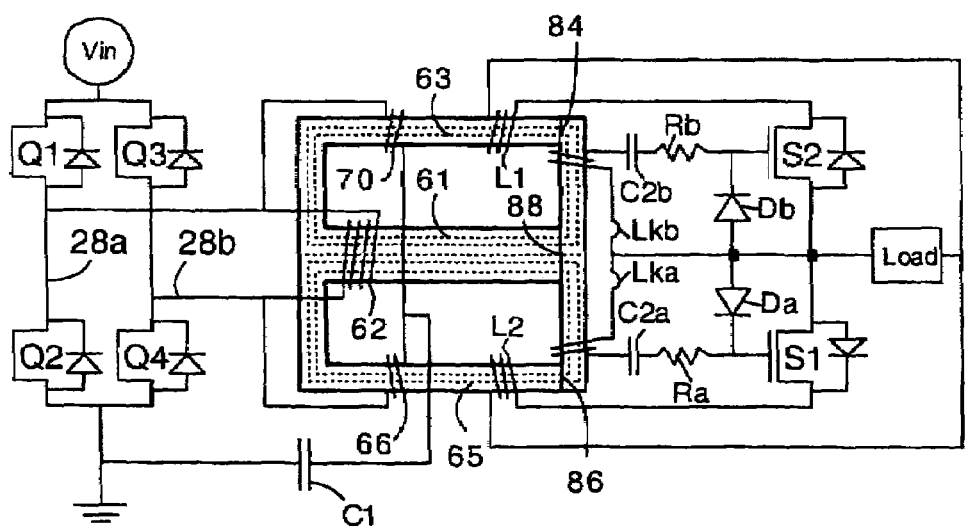
FIG. 20 shows an embodiment having output inductors incorporated on the shared transformer.

FIG. 20 shows an alternative embodiment in which the output inductors L1 L2 are incorporated on the shared transformer core. In this embodiment, the transformer 60 should have air gaps 84 86 88 to prevent saturation of the transformer core 60. The air gaps can be present in only the main yoke 61 or only in the side yokes 63 65, or both. The device of FIG. 20 can have a very small size due to the high level of magnetic integration.

It is noted that the output inductors L1 L2 can also be incorporated on the separate toroidal transformers of FIG. 14, 18 or 19.

Also it is noted that the output inductors L1 L2 can be incorporated on the transformer in embodiments having the asymmetric half bridge primary circuit or the active clamp forward primary circuit.

Also it is noted that the output inductors L1 L2 can be incorporated on the transformer in embodiments having the current doubler secondary circuit, half wave secondary circuit, or center tapped secondary circuit.

Figure 21:
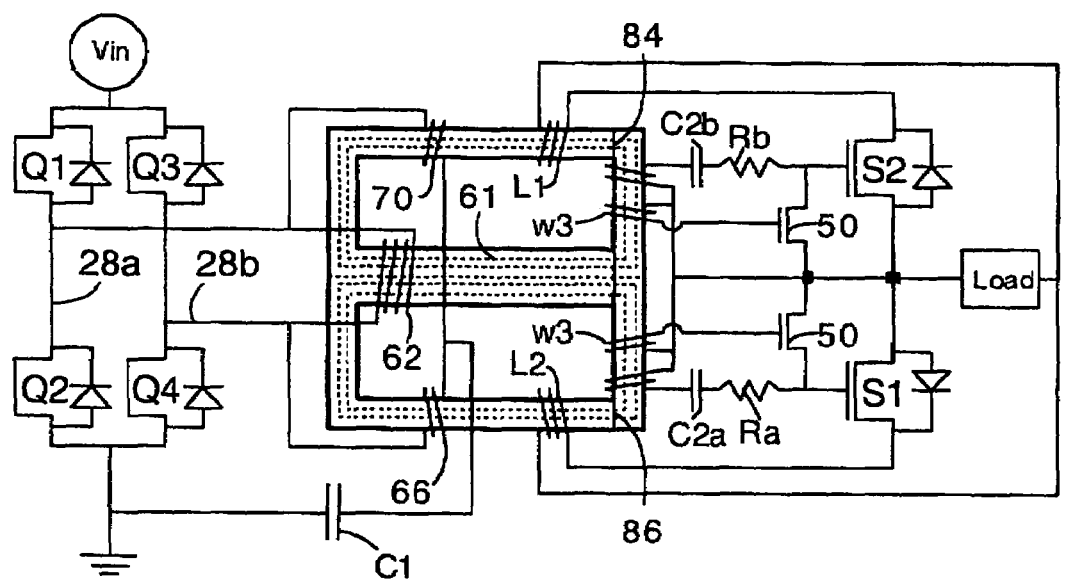
FIG. 21 shows an embodiment having output inductors incorporated on the shared transformer and having driver switches in the secondary circuit.

FIG. 21 shows yet another embodiment having driver switches 50. The driver switches are controlled by trigger windings W3. The circuit of FIG. 21 has the same driver circuit illustrated in FIG. 11. Also, the circuit of FIG. 21 has output inductors L1 L2 incorporated on the transformer. For clarity, leakage inductance is not illustrated in FIG. 21.

It is noted that the circuit of FIG. 21 can be implemented with two separate toroidal transformer cores instead of the single figure-8 core shown.

In the circuits of FIGS. 20 and 21, the output inductors L1 L2 perform the function of the secondary power winding 64 since they are incorporated on the shared transformer. Hence, the secondary power winding 64 is not necessary in the embodiment of FIGS. 20 and 21.

The embodiments of FIGS. 13–21 can be operated according to the control scheme of FIG. 2. Other kinds of control schemes that can be used with these circuits include complementary control, phase shift control and active clamp control.

It is noted that the secondary circuits can have more than two switches. For example, the secondary circuits can include several rectifying circuits connected in parallel and operated synchronously.

Although not shown, it is noted that any of the circuits disclosed herein can have a DC-blocking capacitor in series with the primary power winding, as known in the art.

Finally, it is noted that the present invention can be used with soft switching or hard switching. Zero-voltage switching (ZVS) control of the primary circuit is preferred because it provides reduced power loss, as known in the art. Particularly, complementary control (a kind of ZVS) can be used with any of the primary circuits disclosed herein, including shared transformer embodiments. Other kinds of ZVS that can be used in combination with the invention include phase shift control and active clamp control.

It will be clear to one skilled in the art that the above embodiment may be altered in many ways without departing from the scope of the invention. Accordingly, the scope of the invention should be determined by the following claims and their legal equivalents.

What is claimed is:

1. A power converter comprising:
    a) a primary circuit with a swing node;
    b) a secondary circuit with at least a first rectifying switch and a second rectifying switch;
    c) a transformer coupling the primary and secondary circuits;
    d) on the transformer, a power primary winding connected to the swing node;
    e) on the transformer, a first primary drive winding connected to a swing node and connected to a ground or voltage supply;
    f) on the transformer, a first secondary drive winding coupled to the first primary drive winding, for driving the first rectifying switch;
    g) a primary capacitor in series with the first primary drive winding.

2. The power converter of claim 1 further comprising:
    a) on the transformer, a second primary drive winding connected to a swing node and connected to a ground or voltage supply;
    b) on the transformer, a second secondary drive winding coupled to the second primary drive winding, for driving the second rectifying switch;
    c) a primary capacitor in series with the second primary drive winding.

3. The power converter of claim 2 wherein the transformer has a core with figure-8 topology and 3 yokes, and wherein:
    a) the power primary winding is disposed on a first yoke;
    b) the first primary drive winding and first secondary drive winding are disposed on a second yoke; and
    c) the second primary drive winding and second secondary drive winding are disposed on a third yoke.

4. The power converter of claim 2 wherein the transformer has first and a second toroidal cores, and wherein:
    a) the power primary winding comprises two separate windings, with one winding on each toroidal core, wherein the separate windings are connected in series or in parallel;
    b) the first primary drive winding and first secondary drive winding are disposed on the first toroidal core;
    c) the second primary drive winding and second secondary drive winding are disposed on the second toroidal core.

5. The power converter of claim 1 wherein the primary circuit is a circuit selected from the group consisting of a full bridge circuit, an active clamp forward circuit, and an asymmetrical half-bridge circuit.

6. The power converter of claim 1 wherein the secondary circuit is a circuit selected from the group consisting of a half wave circuit, a current doubler circuit, and a center-tapped circuit.

7. The power converter of claim 1 further comprising a damping resistor connected between the first secondary drive winding and the first rectifying switch.

8. The power converter of claim 7 wherein the damping resistor has a resistance less than 5 ohms.

9. The power converter of claim 1 further comprising a secondary capacitor connected between the first secondary drive winding and the first rectifying switch.

10. The power converter of claim 1 further comprising output inductors incorporated on the transformer.

11. The power converter of claim 1 further comprising a trigger winding on the transformer and comprising a driver switch connected across the secondary winding, wherein the trigger winding is connected to a gate of the driver switch.

12. A power converter comprising:
a) a primary circuit with a swing node;
b) a secondary circuit with at least a first rectifying switch and a second rectifying switch;
c) a transformer coupling the primary and secondary circuits, wherein the transformer has a figure-8 topology with 3 yokes;
d) on a first yoke, a primary power winding;
e) on a second yoke, primary and secondary drive windings for driving the first switch; and
f) on a third yoke, primary and secondary drive windings for driving the second switch;
wherein the primary drive windings are connected to the swing node and connected to a ground or voltage supply.

13. The power converter of claim 12 wherein the primary circuit is a circuit selected from the group consisting of a full bridge circuit, an active clamp forward circuit, and an asymmetrical half-bridge circuit.

14. The power converter of claim 12 wherein the secondary circuit is a circuit selected from the group consisting of half wave circuit, a current doubler circuit, and a center-tapped circuit.

15. The power converter of claim 12 further comprising a damping resistor connected between the first rectifying switch and secondary drive winding, and a second damping resistor connected between the second rectifying switch and secondary drive winding.

16. The power converter of claim 15 wherein the damping resistors each have a resistance less than 5 ohms.

17. The power converter of claim 12 further comprising output inductors incorporated on the transformer.

18. The power converter of claim 12 further comprising a trigger winding on the transformer and comprising a driver switch connected across one of the secondary windings, wherein the trigger winding is connected to a gate of the driver switch.

* * * * *

UNITED STATES PATENT AND TRADEMARK OFFICE
CERTIFICATE OF CORRECTION

PATENT NO. : 7,016,203 B2 Page 1 of 1
APPLICATION NO. : 10/852683
DATED : March 21, 2006
INVENTOR(S) : Xu et al.

It is certified that error appears in the above-identified patent and that said Letters Patent is hereby corrected as shown below:

Title page, item [75] Inventors add "Douglas R. Sterk, Blacksburg, VA (US)".

Signed and Sealed this

Eighteenth Day of July, 2006

JON W. DUDAS
*Director of the United States Patent and Trademark Office*